United States Patent [19]
Ridge

[11] Patent Number: 5,217,275
[45] Date of Patent: Jun. 8, 1993

[54] GOLF CART COVER

[75] Inventor: William Ridge, Chatsworth, Ga.

[73] Assignee: Club Pro Products, Louisville, Ky.

[21] Appl. No.: 837,036

[22] Filed: Feb. 18, 1992

[51] Int. Cl.[5] .............................................. B60J 9/00
[52] U.S. Cl. .................... 296/77.1; 296/136; 150/166
[58] Field of Search ............ 296/77.1, 78.1, 136; 150/159, 166 X; 280/DIG. 5

[56] References Cited

U.S. PATENT DOCUMENTS

| 4,098,536 | 7/1978 | Mills | 296/77.1 |
| 4,294,483 | 10/1981 | Ferris | 296/136 |
| 4,773,694 | 9/1988 | Gerber | 296/77.1 |

*Primary Examiner*—Robert R. Song
*Attorney, Agent, or Firm*—Theresa Fritz Camoriano

[57] ABSTRACT

A cover for a gold cart which can readily be carried and put on and off the cart.

7 Claims, 3 Drawing Sheets

GOLF CART COVER

BACKGROUND OF THE INVENTION

The present invention relates to golf carts, and, more particularly, to a portable cover for golf carts.

In the past, the only golf cart covers that were available were sold as accessories to specific golf carts, because they had to be made to fit a specific cart and required certain attachment means on the cart, such as snaps. This meant that the golfer had to depend on the golf course to provide a golf cart cover for protection from the elements.

Taking covers on and off of carts has been fairly difficult, with the covers being bulky, heavy, and difficult to handle. Installation also required the use of various snaps or straps that attached directly to the cart.

SUMMARY OF THE INVENTION

The present invention is a substantial improvement over the prior art, because it provides a golf cart cover that is very lightweight and easy to carry and that does not require any attachment means on the cart itself. This means that golfers can bring a cover with them and put it in the back of the cart whenever and wherever they go golfing. Then, if the weather gets bad, they can simply take the cover out of its bag, put it on the cart, and keep golfing. They are not dependent upon the golf course supplying covers for their carts, and they do not have to stand in the rain for 20 minutes trying to get a difficult, bulky cover installed on their cart.

The present golf cart cover also has other advantages over the prior art. For example, the back of the cover is transparent, so the golfer can see everything in the back of his cart from the outside. Also, the cover has a vertical, double-acting zipper in the back so it can be opened at any point to reach articles in the back of the cart. In addition, the back portion of the cover extends farther down than do the sides of the cover, in order to protect the articles in the back of the cart from water splashing up as the cart is driven.

DESCRIPTION OF THE PREFERRED EMBODIMENTS

Figure 1:
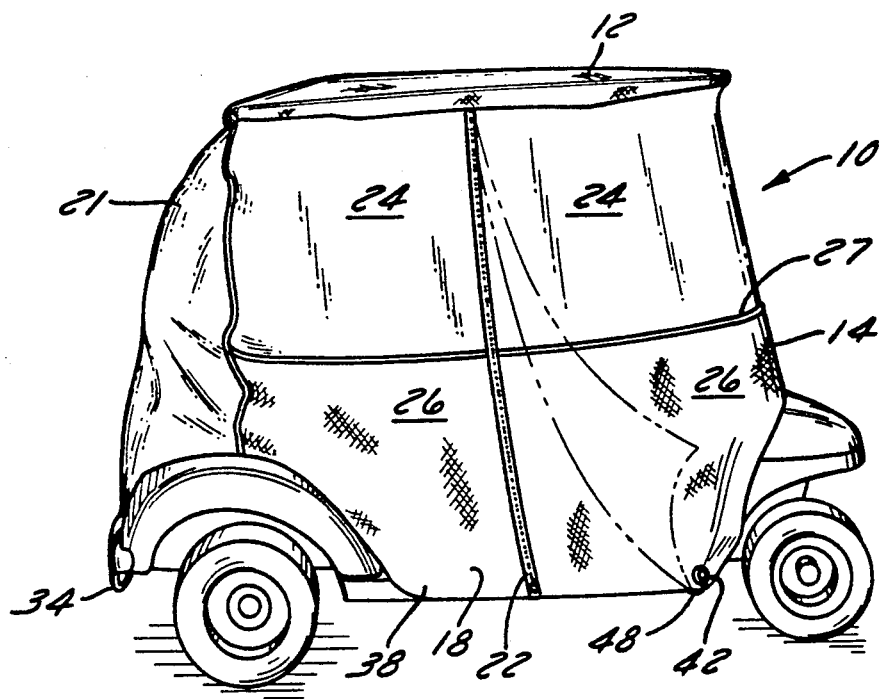
FIG. 1 is a perspective view of a cart with a cover made in accordance with the present invention.
Figure 2:
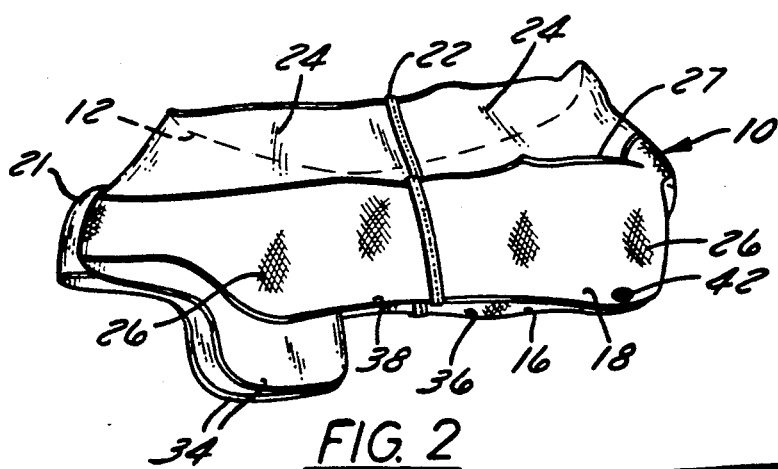
FIG. 2 is a perspective view of the cover of FIG. 1 after it has been removed from the cart.

The first embodiment of the golf cart cover 10, shown in FIGS. 1-2 and 7-8, includes a rectangular top portion 12, which rests on top of the roof of the golf cart. A front portion 14, left and right side portions 16, 18, and rear 21 portion are stitched to and are suspended from the top portion 12. Each of the side portions 16, 18 is divided into two parts by a vertical zipper 20, 22, which permits people to get into and out of the covered golf cart on either side. The upper part 24 of the front, left and right portions 14, 16, 18 is made of a transparent material, preferably a clear vinyl, so the people in the cart can see out. The lower part 26 of those portions 14, 16, 18 is made of a more rugged, opaque material, such as nylon. The upper and lower portions are stitched together along a seam line 27. The rear portion 21, is a separate piece, made entirely of the transparent material so that, when the golfer is standing behind the cart, he can see everything he has stored in the back of the cart. The rear portion 21 has a central vertical zipper 28 which extends the full length of the rear portion 21, so that articles at any height in the back of the cart can be reached. The zipper 28 in the rear portion 21 is a double-acting zipper, having two zipper heads 30, 32, so an opening can be made at any height along the zipper by moving the zipper heads apart at that point.

The bottom edge 34 of the rear portion 21 extends down below the bottom edges 36, 38 of the side portions 16, 18. By extending well beyond the opening in the rear of the cart, the rear portion 21 protects against water splashing up into the rear of the cart.

Near the bottom edges 36, 38 of the left and right side portions, in positions opposed to each other, are grommets 40, 42, which have a central opening and serve to reinforce the side portions around the openings. As seen best in FIG. 7, an elongated elastic member 44, having hooks 46, 48 at its two ends, is used to hold the cover 10 on the cart. The first hook 46 is hooked into the left grommet 40, the elastic member 44 is extended under the bottom of the cart, and the second hook 48 is then hooked into the right grommet 42. The elongated elastic member 44 is sized so that it stretches somewhat when installed in order to constantly apply a force which pulls the bottom edges toward each other. The elastic force of the elongated member 44 helps hold the cover 10 in place on the cart.

Figure 6:
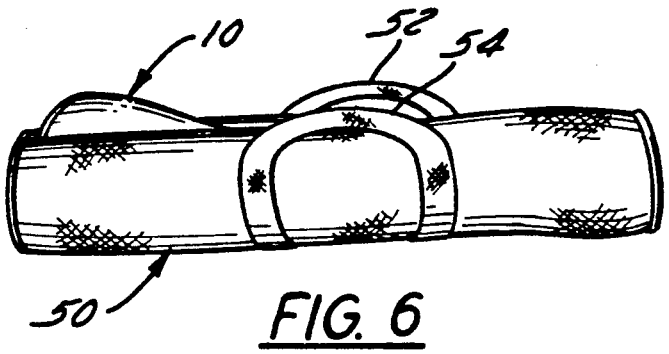
FIG. 6 is a perspective view of a bag and cover made in accordance with the present invention.

The zipper bag 50, shown in FIG. 6, is sized to receive the cover 10 when the cover 10 is folded. The zipper bag 50 is preferably made of nylon and has two handles 52, 54 for ease in carrying. The cover 10 and bag 50 together weigh less than ten pounds, making the present invention very portable.

Figure 3:
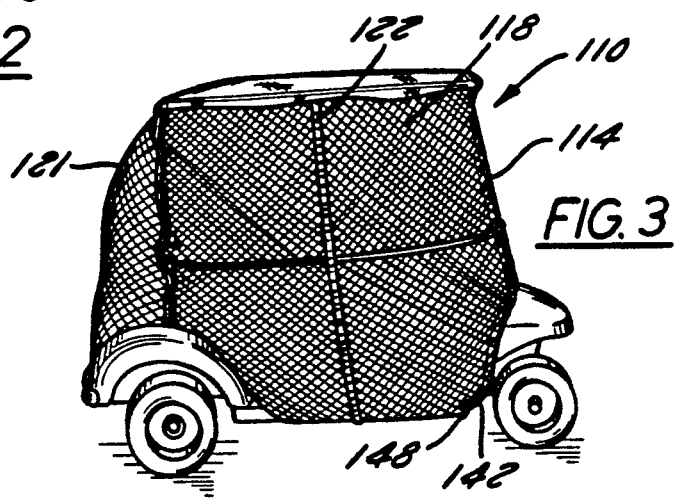
FIG. 3 is a perspective view of a cart with a cover showing a second embodiment of the invention.

Additional embodiments of the invention are also contemplated and are numbered corresponding to the numbers in the first embodiment. The second embodiment, shown in FIG. 3, shows a cover 110, which is substantially identical to the first cover 10, except that the entire cover 110 is made of a netting material, which is transparent, due to the openings in the nettings. The purpose of this cover is not to keep out rain, as was the case with the first embodiment, but rather to keep out flying golf balls. The netting provides a transparent front portion 114, transparent side portions 116, 118, and a transparent rear portion 121. The zippers 120, 122 and grommets 140, 142 function the same way in this second embodiment as they did in the first embodiment. There is also a central vertical zipper 128 (not shown) in the rear portion 121.

Figure 4:
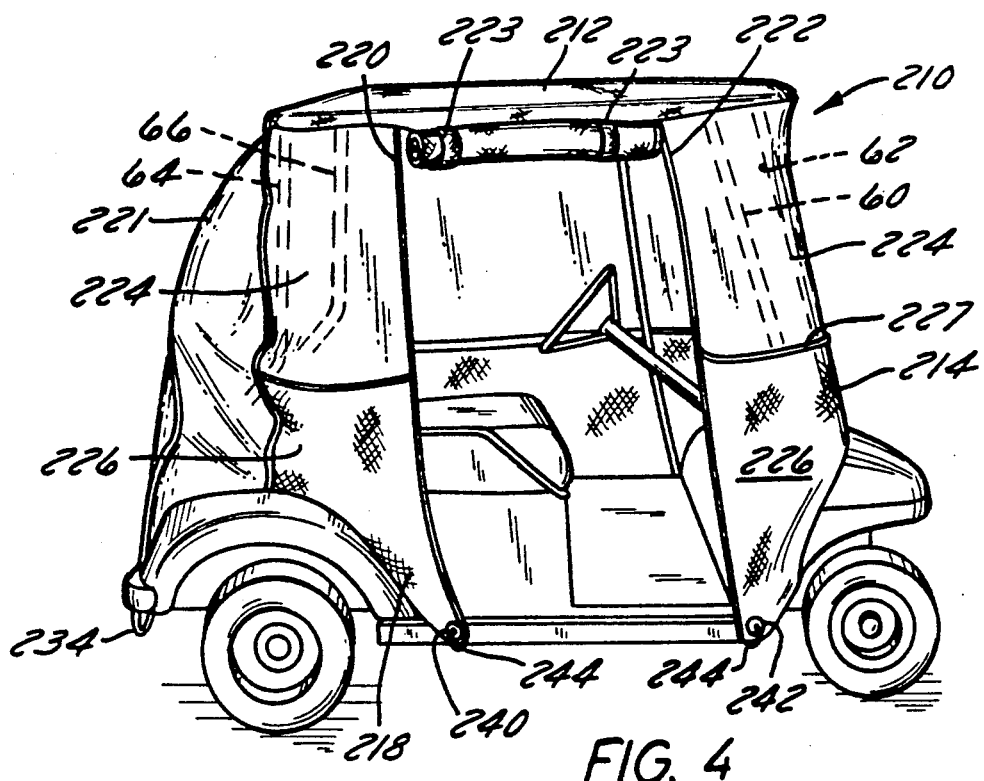
FIG. 4 is a perspective view of a cart with a cover showing a third embodiment of the invention.
Figure 5:
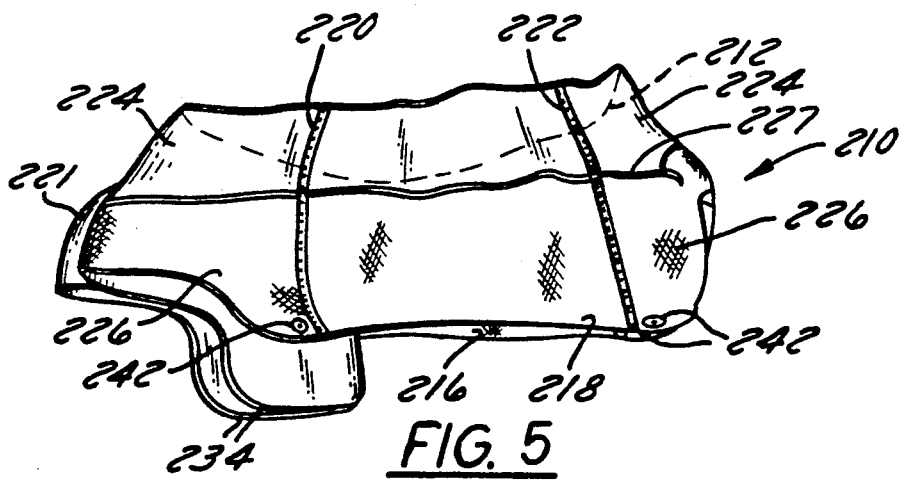
FIG. 5 is a perspective view of the cover of FIG. 4 after it has been removed from the cart.

A third embodiment of the present invention, shown in FIGS. 4 and 5, shows a cover 210 with two zippers 220, 222 on each side, and the portion of the cover between the zippers can be rolled up and held up by Velcro strips 223, which are sewn to the inside of the top portion 212 of the cover 210. The third embodiment also has two grommets 240, 242 on each side, one forward of the front zipper, and one behind the rear zipper. This permits the use of a second elastic member 244 on this cart.

Figure 7:
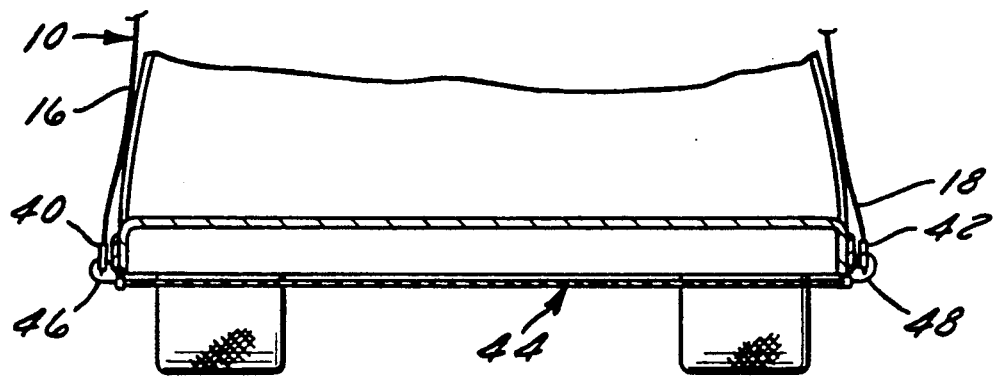
FIG. 7 is a rear view partially in section of the cart and cover of FIG. 1.
Figure 8:
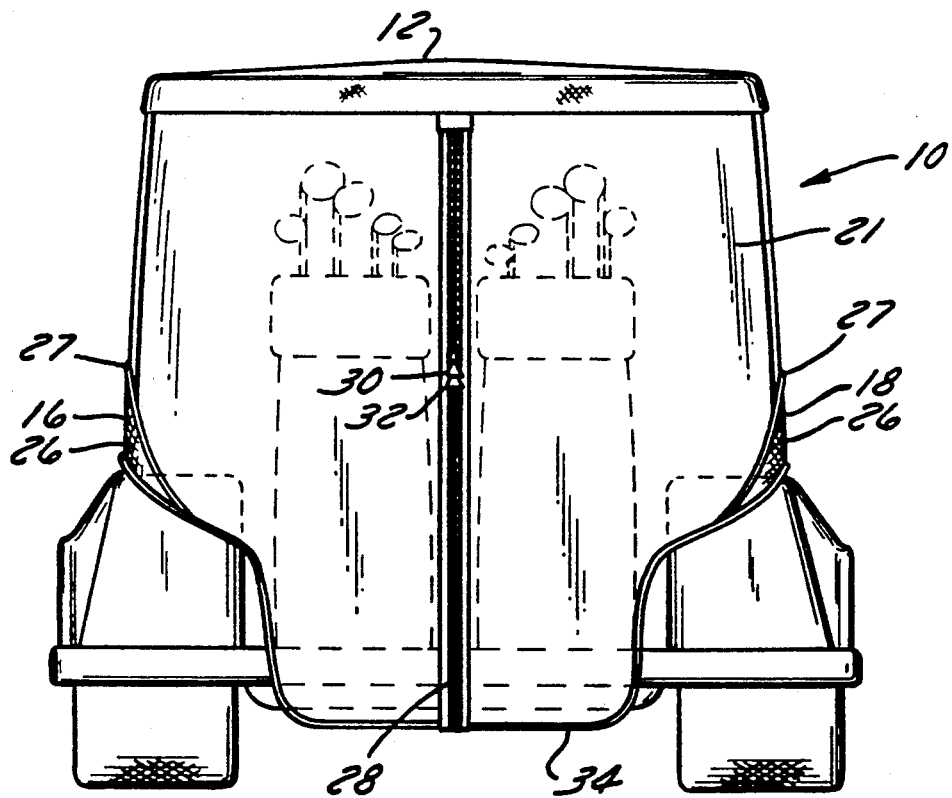
FIG. 8 is a rear view of the cart and cover of FIG. 1.

The rear view of the cart and cover shown in FIGS. 7 and 8 would look the same for all three embodiments, except that, in the second embodiment, the rear section is made of netting instead of clear material. FIG. 7 shows a rear sectional view, in which the elastic member 44 is shown extending under the cart, hooked into the grommets 40, 42 by means of hooks 46, 48. In the third embodiment, there are two elastic members and two sets of grommets, but the rear view would look the same.

In order to install the cover 10 on the cart, the cover 10 is removed from its bag 50, and is placed on the roof of the cart, with the front portion 14 of the cover lying forward of the front roof supports, which are shown as items 60 and 62 in FIG. 4. The rear portion 21 of the cover 10 fits behind the rear roof supports 64, 66, and the sides 16, 18 of the cover are extended down, until the grommets 40, 42 lie adjacent to the bottom of the cart frame. Then, the elastic cord is hooked into one grommet 40, is extended under the cart and hooked to the second grommet 42, and the cover is installed. Extending the cord under the cart can be facilitated by hooking the free end of the cord to a golf club (not shown) and pushing it under the cart, then hooking the free end of the cord to the other grommet. The second embodiment is installed the same way as the first, and the third embodiment is installed the same way, except that two elastic cords are used in the third embodiment.

It will be obvious to those skilled in the art that modifications may be made to the embodiments disclosed herein without departing from the scope of the present invention.

What is claimed is:

1. A cover for a golf cart, comprising: a top portion; a front portion; a back portion; and left and right side portions; wherein each of said portions defines a top and bottom, and wherein the bottom of said back portion extends substantially below the bottom of said side portions in order to protect against water splashing up into the back of the cart.

2. A cover for a golf cart as recited in claim 1, wherein said back portion has a central vertical zipper which extends from the top to the bottom of said back portion.

3. A cover for a golf cart as recited in claim 2, wherein said back portion is transparent from top to bottom.

4. A cover for a golf cart as recited in claim 2, wherein said central vertical zipper is a double-acting zipper, having two zipper heads which create an opening as they move away from each other, so that the opening can be made at any height along the zipper.

5. A cover for a golf cart, comprising:
 a top portion; a front portion; a back portion; and left and right side portions, wherein said left and right side portions each define a door, each of said doors being adapted to open vertically and roll up; and including means on said top portion for retaining said doors when they are rolled up; and
 wherein said left and right side portions each define a lower edge, and wherein said left and right side portions each define two reinforced opening near their lower edge, one reinforced opening forward of the door, and one reinforced opening rearward of the door; said left and right forward reinforced openings being adapted to receive hooks mounted at the ends of a first elongated elastic member, and said left and right rear reinforced openings being adapted to receive hooks mounted at the ends of a second elongated elastic member so as to stabilize the side portions while opening or closing said doors.

6. A cover for a golf cart as recited in claim 5, wherein said back portion defines a top and a bottom, and further comprising a central vertical zipper extending from the top to the bottom of said back portion.

7. A cover for a golf cart as recited in claim 6, wherein said zipper is double-acting, having two zippered heads which form an opening as they are separated from each other.

* * * * *